United States Patent [19]

Mitsui

[11] E Re. 31,590

[45] Reissued May 29, 1984

[54] ATOMIZATION IN ELECTROSTATIC COATING

[75] Inventor: Michio Mitsui, Yokohama, Japan

[73] Assignee: Ransburg Japan, Ltd., Tokyo, Japan

[21] Appl. No.: 250,095

[22] Filed: Apr. 1, 1981

Related U.S. Patent Documents

Reissue of:

[64] Patent No.: 4,148,932
Issued: Apr. 10, 1979
Appl. No.: 872,066
Filed: Jan. 25, 1978

[30] Foreign Application Priority Data

Feb. 7, 1977 [JP] Japan ..... 52/12286
May 31, 1977 [JP] Japan ..... 52/63872

[51] Int. Cl.[3] ..... B05D 1/04; B05B 5/04

[52] U.S. Cl. ..... 427/31; 118/626; 239/703

[58] Field of Search ..... 427/31; 118/626; 239/3, 239/700, 703, 224, 223

[56] References Cited

U.S. PATENT DOCUMENTS

| | | |
|---|---|---|
| 1,682,037 | 8/1928 | Craig . |
| 2,097,028 | 10/1937 | Gates . |
| 2,159,400 | 5/1939 | Preston . |
| 2,200,675 | 5/1940 | Northcutt . |
| 2,220,275 | 11/1940 | Preston . |
| 2,257,004 | 9/1941 | Fleming . |
| 2,430,697 | 11/1947 | Allan . |
| 2,564,392 | 8/1951 | Burrucker . |
| 2,878,063 | 3/1959 | Kish et al. . |
| 2,893,893 | 7/1959 | Crouse . |
| 2,893,894 | 7/1959 | Ransburg . |
| 3,017,116 | 1/1962 | Norris . |
| 3,043,521 | 7/1962 | Wampler . |
| 3,065,106 | 11/1962 | Rhodes et al. . |
| 3,128,201 | 4/1964 | Gauthier . |
| 3,458,137 | 7/1969 | Behr . |
| 3,556,400 | 1/1971 | Gebhardt et al. . |
| 3,735,924 | 5/1973 | Wirth . |

FOREIGN PATENT DOCUMENTS

| | | |
|---|---|---|
| 165258 | 12/1904 | Fed. Rep. of Germany . |
| P2095 | of 0000 | Fed. Rep. of Germany . |
| 884326 | 7/1953 | Fed. Rep. of Germany . |
| 32362 | 12/1955 | Fed. Rep. of Germany . |
| 973478 | 3/1960 | Fed. Rep. of Germany . |
| 975380 | 11/1961 | Fed. Rep. of Germany . |
| 1652390 | 7/1970 | Fed. Rep. of Germany . |
| 982327 | 1/1951 | France . |
| 326665 | 12/1957 | Switzerland . |
| 429275 | 5/1935 | United Kingdom . |
| 665655 | 1/1952 | United Kingdom . |
| 710920 | 6/1954 | United Kingdom . |
| 846181 | 8/1960 | United Kingdom . |
| 1198946 | 7/1970 | United Kingdom . |
| 1515511 | 6/1978 | United Kingdom . |

OTHER PUBLICATIONS

Gebhardt "Protection Against Corrosion by Metal Finishing" from *Oberflachenbehandlung als Korrosionsschutz* edited by N. Ibl et al, Forster-Verlag AG Zurich, 1967, pp. 297-303.

Adler et al, "Chem. Eng. Prog.", vol. 47, No. 10, pp. 515-522, Oct. 1951; vol. 47, No. 12, pp. 601-608, Dec. 1951.

*Primary Examiner*—John H. Newsome

*Attorney, Agent, or Firm*—Willian, Brinks, Olds, Hofer, Gilson & Lione, Ltd.

[57] ABSTRACT

A method of atomizing liquid paint using a rotating atomizing device and electrostatically coating an article with a smooth homogeneous film of paint and without the generation of foam or other surface irregularities on the article being coated, wherein an electrostatic field is established between the peripheral edge of the rotating atomizing device and the article to be coated and the liquid paint flows toward the edge of the atomizing device as a continuous thin film, which film is formed into a circumferential series of branch flows of narrow width flowing in the peripheral direction of the atomizing edge, and the liquid paint is atomized from the series of branch flows as they are projected beyond the edge of the atomizing device. The rotary atomizing device may be in the form of a bell or disk and includes a plurality of shallow grooves near its periphery preferably extending radially and of increasing depth in the direction of paint flow and terminating at the discharge edge.

13 Claims, 14 Drawing Figures

ATOMIZATION IN ELECTROSTATIC COATING

Matter enclosed in heavy brackets [ ] appears in the original patent but forms no part of this reissue specification; matter printed in italics indicates the additions made by reissue.

This invention relates to a method of electrostatically atomizing a liquid paint and performing the electrostatic coating of an article to be coated by the use of a rotary atomizing device, especially a rotary atomizing device rotated at a high speed, said method preventing the formation of foam on the paint film applied to the article, whereby a high quality coating is obtained. The present invention utilizes bell and disk type rotary atomizing devices for electrostatic coating.

There has been an increasing trend in recent years toward the use of liquid paints having a small solvent content and a relatively high viscosity for the purpose of preventing environmental pollution. To satisfactorily atomize a liquid paint of a relatively high viscosity using a rotary atomizing device, however, it is often necessary to rotate the rotary atomizing device at a considerably higher rotational speed.

In atomizing a liquid paint using a rotary atomizing device, the degree of atomization of the paint is generally in inverse proportion to the thickness of the film of the liquid paint that is led in the state of a thin film to the circular discharge edge along the surface of the rotary atomizing device. On the other hand, film thickness is proportional to the quantity of the paint discharged and inversely proportional to the product of the rotational frequency of the rotary atomizing device and the radius of the circular discharge edge.

For this reason, when use is made of a compact rotary atomizing device in which either the radius of the device or that of the circular discharge edge is reduced so as to reduce the size and weight of the device, it is necessary to significantly increase the rotational frequency of the device during the atomization of even a liquid paint of a relatively low viscosity in order to obtain satisfactory atomization of the liquid paint, or to reduce the thickness of the liquid paint film supplied to the circular discharge edge.

However, when the rotational frequency of the rotary atomizing device exceeds 4000 rpm during the electrostatic coating, a large number of bubbles may form on the surface of the paint film applied to the article being coated, depending upon the kind of the liquid paint used, the discharge quantity of the paint per unit time, and so forth. The bubbles deteriorate the quality of the resulting coating, and excessive foaming can completely spoil the coated article itself.

It is therefore an object of the present invention to provide a method of electrostatic coating using a rotary atomizing device which prevents the occurrence of foam or other imperfections on a paint film applied to the surface of an article so as to provide a high-quality coating, irrespective of the rotational frequency of the rotary atomizing device, the kind of the liquid paint used, the discharge quantity of the paint per unit time, and the like. It is another object of the present invention to utilize bell type and disk type rotary atomizing devices which prevent the development of foam on the paint film and enable electrostatic coating to be performed in a satisfactory manner.

The invention may best be understood by referring to the following description and accompanying drawings.

Figure 8C:
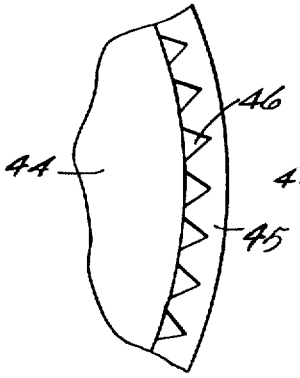
Figure 8B:
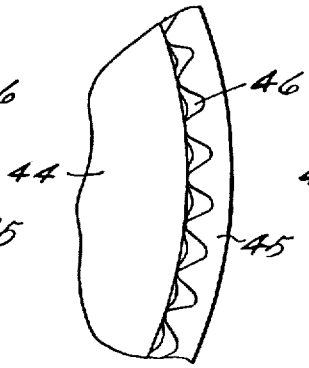
Figure 8A:
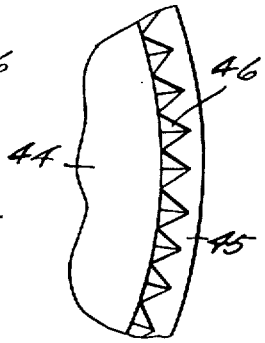
Figure 9:
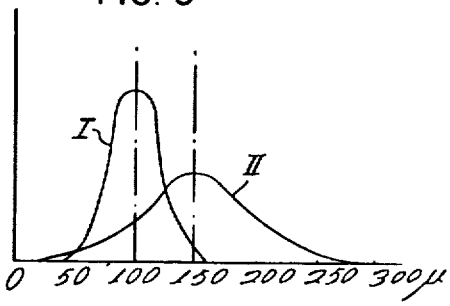
Figure 8D:
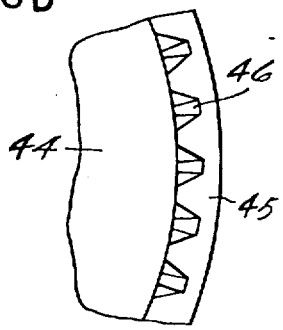

FIGS. 5, 6 and 7a–c are fragmentary sectional side elevational views illustrating various construction details of rotary atomizing devices;

FIGS. 8a–d are fragmentary end elevational views illustrating various construction details of rotary atomizing devices; and, FIG. 9 is a graph illustrating distribution of atomized paint droplet diameters according to the present method and apparatus and according to a prior art method and apparatus.

Various factors have been pointed out as the causes of foaming on paint films. The inventors of this invention have assumed that the important factors are the physical conditions of the liquid paint when it is being led to the circular discharge edge along the surface of the rapidly rotating rotary atomizing device, and when it is discharged from the discharge edge and atomized. On the basis of this assumption and in order to clarify the factors involved in foaming, the inventors have taken a number of stroboscopic pictures of the state of the liquid paint on the surface of the rotary atomizing device and the conditions under which the liquid paint is discharged and atomized.

As a result, the present inventors have discovered that when the electrostatic atomization of the paint is normally carried out by the rotary atomizing device, the liquid paint flows toward the circular discharge edge having a knife edge-shaped section to the outside in an axial direction (in the case of the bell type device) or in the radial direction (in the case of the disk type device), thereupon forming a number of so-called "cusps" (liquid strands). Due to the action of the electrostatic field generated by high DC voltage applied between the discharge edge and the article for coating, atomization is attained by a small amount of the liquid paint at the tip of each cusp being separated and removed and formed into a fine droplet.

Figure 1:
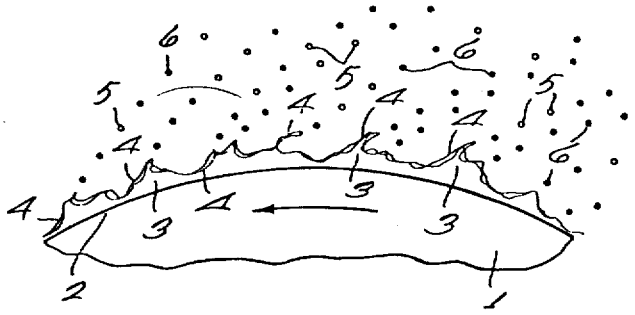
FIG. 1 illustrates a cusp formation and configuration adjacent the circular discharge edge of a rotary atomizing device.

However, under the condition where the rotary atomizing device is rotated at a high speed and a number of air bubbles form on the paint film applied to the surface of the article, atomization of the paint by the release of minute paint droplets from the tip of each of a large number of cusps formed along the whole periphery of the circular discharge edge is not attained. On the contrary, the inventors have discovered as shown in FIG. 1, there is formed a liquid film 3 composed of a number of irregular triangles that have a considerable width and extend from the periphery beyond the entire circumference of the circular discharge edge 2 of the rotary atomizing device 1 towards the flared forward portion to the outside or towards the flared outward portion. The outer periphery 4 of this liquid film 3 is extremely unstable and interacts with the ambient air due to the high speed rotation of the rotary atomizing device.

While the film 3 is thus turned over and twisted and draws in the air due to the interaction, it is acted upon by the electrostatic field whereby its outer periphery 4 is torn off and aggregates in spherical form, thus forming a number of paint droplets 5 each of which entraps trace amounts of air. It has been found by the inventors that these air-entrapping paint droplets 5 are admixed and released together with ordinary paint droplets 6.

It is therefore believed that the development of foam on the paint film on the surface of the article coated by electrostatic coating using a rapidly rotating rotary atomizing device is primarily caused by the fact that a number of air-entrapping paint droplets 5 are attracted to the article to be coated by the action of the electrostatic field, attach to the surface of the article and form the paint film with entrapped air.

In order to prevent the formation of the air-entrapping paint droplets arising from the torn outer periphery of the irregular triangular liquid film, the inventors have experimented with a bell type rotary atomizing device having a number of triangular protuberances along the circumference of the circular discharge edge, as disclosed in Japanese Patent Publication No. 1266/1961. It was found that when the paint has a relatively low viscosity and is discharged in small quantities, a substantially triangularly shaped liquid film is supported by each triangular protuberance. Accordingly, the outer periphery of each liquid film forms a cusp from the apex of the triangular protuberance or from the outer periphery along two sides thereof and atomization of paint is effected from the tip of the cusp.

However, when the viscosity of the liquid paint and the quantity discharged exceed certain critical values (e.g., a discharge rate of about 200 cc/min. at a viscosity of 30 sec/Zahn cup No. 2 and a discharge rate of about 300 cc/min. at a viscosity of 25 sec/Zahn cup No. 2), it has been found that the liquid films span adjacent pairs of the triangular protuberances, and the outer periphery of each liquid film is turned over or twisted due to its interaction with the electrostatic field and forms air-entrapping paint droplets which result in the development of air bubbles or foam on the liquid paint film on the article being coated.

Moreover, it has been confirmed that since the above-described bell type rotary atomizing device having a number of the triangular protuberances provided over the entire discharge edge has a number of apexes where there is a high concentration of an electric field, the potential gradient increases to a dangerous extent so that the device cannot be safely used.

Figure 2:
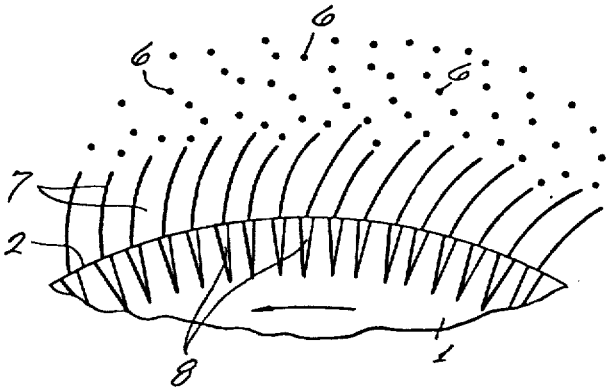
FIG. 2 illustrates a method of electrostatic coating and a rotary atomizing device for practicing the method.

Accordingly, the inventors have carried out intensive research in quest of a method of preventing the formation of the above-mentioned irregular liquid films on the circular discharge edge of a rapidly rotated rotary atomizing device to eliminate the development of foam on the deposited paint film. As a result, the inventors have perfected a method of atomizing liquid paint using an electrostatically charged rotary atomizing device in which the liquid paint led in the form of a thin continuous film along one surface of the rotary atomizing device, for example, the internal surface of a bell shaped atomizer or one surface of a disk shaped atomizer, is formed into a multiplicity of narrow branching streams separated from one another in the circumferential direction of the rotary atomizer 1 as schematically illustrated in FIG. 2.

When the liquid paint supplied in this manner to the entire circumference of the discharge edge 2 in the form of a multiplicity of narrow film-like branching streams reaches the discharge edge 2, it does not form a liquid film extending beyond the discharge edge towards the flared forward portion to the outside or towards the flared outside portion as shown in FIG. 1, but forms cusps 7 in the form of fine strands corresponding to each of the film-like branched streams which extend beyond the discharge end 2. The tip of each cusp is atomized and released as a fine droplet 6 which has not entrapped air. The droplet is then drawn by electrostatic force to coat the article. Thus, it is possible to prevent the development of foam on the paint film applied to the surface of the article.

According to the present invention, the continuous thin film along one surface of the rotary atomizing device may be formed into a number of narrow film-like branching streams 6 by a variety of means. One very effective means is to provide a number of shallow grooves, e.g., thin triangular grooves 8 as illustrated, on the surface to which the liquid paint is led in the state of a thin film, that is, on the circumferential wall surface of the internal cavity of the bell type atomizer or on one surface of the disk type atomizer, whereby the grooves 8 reaching the discharge edge, extend substantially in the same direction as the advancing direction of the flow of the liquid paint, i.e., substantially in the axial direction for the bell atomizer and substantially in the radial direction for the disk atomizer.

In a rotary atomizing device rotated at speeds ranging from 4,000 to 16,000 rpm, the thickness of the liquid paint flowing along the surface of the device is generally on the order of about several tens of microns but does not exceed 100 microns when the discharge rate ranges from about 50 to 500 cc/min. By forming each of the grooves 8 to a depth of from 0.2 to 0.4 mm, the flowing film of liquid paint is divided into film-like branching flows mutually spaced in the circumferential direction by said grooves. A length of from 1.5 to about 4 mm is usually sufficient for each groove.

Figure 3:
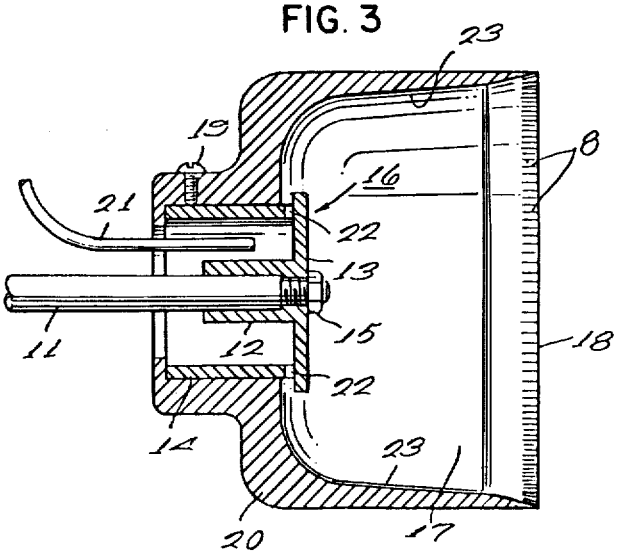
FIG. 3 is a sectional side view illustrating an embodiment of a rotary atomizing device.

FIG. 3 is a sectional side view showing one embodiment of a bell type rotary atomizing device produced in accordance with our invention. The rotary atomizing device comprises a boss 12 fitted to the forward end of a rotary shaft 11 of a rotary driving device (not shown) capable of high speed rotation at from about 10,000 to 16,000 rpm, such as a pneumatic motor, a disk 13 coaxially coupled to the forward edge of the boss, a cylinder 14 coaxially and rearwardly extending from the circumference of the disk 13, a hub member 16 secured to the rotary shaft 11 by a clamping nut 15, and a bell type paint atomizing member 20 which includes an open internal cavity 17 having a circular section and a circular discharge edge 18 having a knife edge-like forward end. The atomizing member 20 is coaxially fitted to the outside of the cylinder 14 of the hub 16 and secured thereto by a lock nut 19.

The liquid paint from a suitable supply source (not shown) through a supply pipe 21 into the gap between the boss 12 of the hub 16 and the cylinder 14 is supplied, dve to the high speed rotation of the device; to the rear end portion of the internal cavity 17 through a plurality of paint apertures 22 provided at the forward end portion of the cylinder 14, and led as thin film having a thickness of about 0.1 mm along the cicumferential wall 23 of the internal cavity.

Along the forward portion of internal cavity 17 are formed a number of grooves 8 each having a length of about 1.5 mm and a maximum depth of about 0.2 to 0.3 mm as the grooves reach the discharge edge 18. These grooves 8 may be formed by knurling using a knurling tool.

The grooves 8 divide the paint film as described above so that at the discharge edge 18 the paint is atomized by the action of the electrostatic field generated by a high DC voltage, e.g. from about 80 to 120 KV, impressed between the discharge edge 18 and an article to be coated (not shown) and electrostatically deposited onto the surface of the article.

When the rotary atomizing device has the above-described construction, having a circular discharge edge with a diameter of 7.3 cm, and operated at a high speed, say at 16,000 rpm, using a liquid paint having a high viscosity of 30 seconds on a Zahn cup No. 2 and a paint discharge rate from about 150 cc/min. to about 500 cc/min., the development of foam is completely prevented on the paint film and a high-quality coating is obtained.

In order to ascertain the effect of the grooves 8 on the dark current, experiments to measure the dark currents were made on a bell type rotary atomizing device according to the present invention and also the prior art. The term "dark current" means the total current flow, usually expressed in microamperes, which is expended by the high voltage painting system. The device used for our experiment had the construction of FIG. 3, including a large number of grooves having a length of about 1.5 mm and a maximum depth of about 0.2 to 0.3 mm. The device of the prior art also used for the experiment has the same shape and size as those of the device shown in FIG. 3 but was not provided with the grooves 8.

When liquid paint is atomized into minute droplets and sprayed onto an article, the quality of the paint film or coating on the article depends largely upon the maximum and average diameters of the atomized paint droplets. Large maximum diameter droplets lower the quality of the coating film according to the following empirically accepted relationship between maximum particle diameter and paint film quality:

| Maximum particle diameter | Quality of paint film |
|---|---|
| 100–200 microns ($\mu$) | Excellent |
| 200–300 microns | Good |
| 300–450 microns | Rather poor |
| over 450 microns | Poor |

To form a paint film of excellent quality it is necessary that the atomized paint have small maximum and average droplet diameters. However, atomized paint containing a large amount of droplets of extremely small diameters is not particularly good because the solvent for the paint evaporates quickly from droplets of extremely small diameter as they move toward the article to be coated. As a result, the substantially solidified resin and pigment causes a reduction in paint film quality. It is instead desirable that the maximum droplet diameter of the atomized paint be adjusted to a small value, for example, a value in the above-mentioned range of 100 to 200$\mu$, and that the diameters of most all the droplets be adjusted to similar values.

In using conventional rotary atomizing devices for electrostatic coating, the diameters of the atomized paint droplets may vary to a great extent depending upon various factors such as the kind of resin used, the kind of solvent, the kind of pigment, the viscosity of paint at the time of use, the electrical resistance and the discharge rate thereof, the diameter and rotational speed of the atomizing device, and the value of the DC voltage applied between the rotary atomizer and article to be coated.

In the case of water based paint and the so-called high-solids paint having a low volatile content which have come to be used in large quantities in recent years for the prevention of environmental pollution, it is often difficult or impossible to obtain atomized paint droplets having the desirable diameters. Even in the case of the ordinary synthetic paints of various types used in many industrial fields, it is sometimes impossible to obtain atomized paint droplets having the desirable diameters.

The diameters of droplets of liquid paint atomized by a rotary atomizing device used for electrostatic coating are determined by the number and thickness of the cusps (liquid threads) formed at the discharge edge of the atomizing device. The paint droplet diameter is large when the number of cusps is small and cusp thickness large, and the paint droplets have small diameters when the number of cusps is large and cusp thickness small. In general, the thickness of the cusps is influenced by the thickness of the paint film at the discharge edge, as expressed by the following formula:

$$\text{Thickness of paint film} \propto \frac{\text{discharge rate} \times \text{viscosity}}{\text{diameter of rotary body} \times \text{rotational frequency}}$$

To more readily achieve the desired maximum and average diameters of the paint particles we have found that the rotary atomizing device, rather than possessing the more conventional sharp or rounded forward edge, should have its forward or discharge end possess a narrow uniform width generally perpendicular to the surface over which the paint flows. A multiplicity of shallow grooves of gradually increasing depth should be provided along the inner peripheral surface over which the paint flows. By use of the foregoing construction, alternative forms of which are shown in FIGS. 4, 5, 6, 7 and 8, the length of the inner peripheral surface of the discharge end of the rotary atomizing device is remarkably increased as compared with conventional rotary devices. Consequently the circumference of the paint film as it is supplied to the discharge end of the atomizing device is greatly increased and the thickness of the paint film is thereby reduced considerably. As a result the number of cusps formed increases and the diameter of these cusps becomes smaller. Accordingly, atomized paint droplets having a small maximum diameter and a narrow distribution of droplet diameters are discharged in a stable condition from the entire circumference of the circular end with a resulting improvement in the quality of the paint film deposited on the article.

The dark current was measured for each of these two devices, by using a plate-like opposed electrode and a needle-like opposed electrode of 0.7 mm diameter respectively, and varying the distance D between the device and the grounded electrode and also the DC voltage V to be impressed on the device, in which the quantity of the discharged paint is zero (where the dark current is larger than in the state of the paint being discharged).

The results are illustrated in the Table below. This confirms that the increase in the dark current due to the provision of the grooves is extremely small and therefore does not pose any operational hazard.

| Experimental Results of Dark Current Measurement | | | | | |
|---|---|---|---|---|---|
| | Voltage V | −90 KV | | −120 KV | |
| Electrode | Current Distance D | Out Invention | Prior Art | Out Invention | Prior Art |
| Plate | 20 cm | 210 μA | 200 μA | 440 μA | 420 μA |
| Electrode | 25 cm | 170 μA | 160 μA | 320 μA | 310 μA |
| | 30 cm | 120 μA | 120 μA | 280 μA | 270 μA |
| Needle | 20 cm | 250 μA | 230 μA | 700 μA | 700 μA |
| Electrode | 25 cm | 170 μA | 160 μA | 420 μA | 420 μA |
| | 30 cm | 120 μA | 120 μA | 320 μA | 310 μA |

Figure 4:
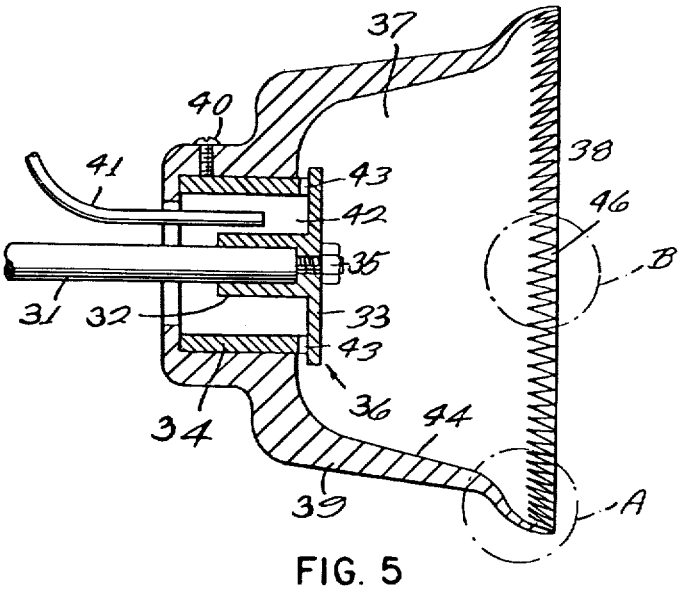
FIG. 4 is a sectional side view illustrating an embodiment of a rotary atomizing device.

FIG. 4 is a side elevational view in cross section of a small rotary atomizing device constructed according to the present invention. This device comprises a hub member 36 including a boss 32 fitted on the front portion of a rotary shaft 31 of a rotary driving means (not shown) such as an air motor rotatable at high speed, for example, 10,000 to 18,000 rpm, a disk portion 33 coaxially connected to the front end of boss portion 32, and a cylindrical portion 34 coaxially extended from the peripheral portion of the disk portion 33, which hub member 36 is fixedly mounted on rotary shaft 31 with a nut 35; and a small diameter paint atomizing bell 39 having a circular cross section and provided with a cavity 37 the front end of which is opened and a circular discharge end 38 surrounding the opening of cavity 37. Bell 39 is connected to hub 36 by coaxially securing the rear end portion of the bell 39 on the outer surface of cylindrical portion 34 of hub 36 by a set-screw 40. A liquid paint supplied from a suitable paint supply source (not shown) into an annular chamber 42, which is defined by boss 32 and cylindrical portion 34 of hub 36, through a paint feed pipe 41 flows, by high-speed rotation driven by rotary shaft 31, into the rear end portion of cavity 37 in bell 39 through a plurality of apertures 43 provided in the wall of cylindrical portion 34 and directed along the inner surface 44 of cavity 37 to the discharge end 38 in the form of thin film the thickness of which is usually less than about 0.1 mm. The paint film thus directed to discharge end 38 is atomized by the electrostatic field created between discharge end 38 and an article (not shown) to be coated by a high DC voltage of, for example, between 80 and 120 KV applied between bell 39 and the article by a suitable high DC voltage source (not shown), and the resulting atomized paint is electrostatically deposited onto the surface of the article.

Figure 5:
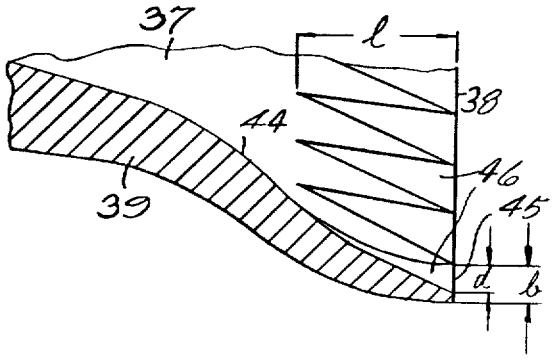

The circular discharge end 38 has a narrow end surface 45 of uniform width substantially at right angles to the peripheral or front end portion of inner surface 44 defining cavity 37 shown in FIG. 5. The front portion of inner surface 44 is provided with a multiplicity of grooves 46 extending in the direction of the flow of liquid paint along the inner surface 44, and these grooves 46 are close to one another with the distances between the center lines thereof being substantially the same, the outer ends of the grooves 46 being open at discharged end surface 45. The grooves 46 may be of an optional elongated shape in plan but are preferably of such a shape that the width and depth are gradually increased from the inner end to the outer end thereof, for example, an elongated V-shape (refer to FIG. 7a), an elongated U-shape (refer to FIG. 7b) and an elongated V-shape having a curved or arc-shaped central line (refer to FIG. 7c). The grooves 46 may be of shapes in cross section as may be understood from FIGS. 8a, 8b, 8c and 8d, such as a shape of V (refer to FIGS. 8a and 8c), a shape of U (refer to FIG. 8b) or a trapezoidal shape (refer to FIG. 8d). The grooves 46 may be made so that their depth is unvaried but they are preferably made so their depth is gradually increased from their inner to outer end.

Figure 6:
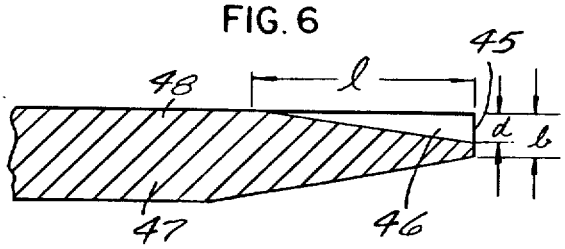

FIG. 6 is an enlarged side view in cross section of the peripheral portion of a paint atomization and discharge disk 47, constructed according to the present invention. In this device, the circular discharge end is also so formed that it has a narrow end surface 45 of uniform width which is at right angles to the inner surface 48 of disk 47 or the surface along which a liquid paint flows toward the discharge end. The peripheral portion of inner surface 48 is provided with a multiplicity of grooves 46 extending substantially in the radial direction and closely spaced at regular intervals with the outer ends thereof opened at end surface 45.

The following are examples of rotary atomizing devices which achieve the objects of the present invention, with numerical values for the width b of the end surface 45 of the circular discharge end, depth d of the outer end portion of grooves 46 opened at end surface 45, pitch P or distance between the central lines of grooves 46, and length l of grooves 46.

EXAMPLE I

A small paint atomization bell having a diameter of 4 to 10 cm:
Width b of end surface of discharge end: 0.2–1.0 mm
Depth d of outer end portion of grooves: 0.1–0.4 mm
Pitch P of grooves: 0.2–1.0 mm
Length l of grooves: 1.0–10 mm

EXAMPLE II

A bell-shaped or disk-type paint atomization device having a diameter of 10 to 64 cm:
Width b of end surface of discharge end: 0.2–4 mm
Depth d of outer end portion of grooves: 0.1–3 mm
Pitch P of grooves: 0.2–3 mm
Length l of grooves: 1.0–15 mm In the above examples, the thickness of paint film supplied to discharge end along the inner surface of paint atomization and discharge member is usually several tens of microns but does not exceed 100 microns.

Figure 7C:
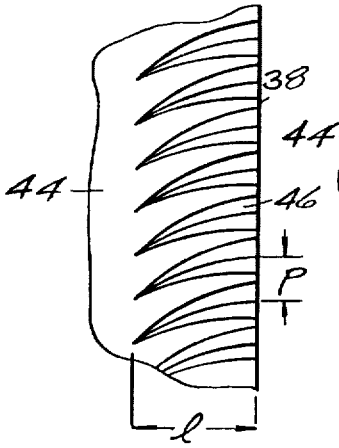
Figure 7B:
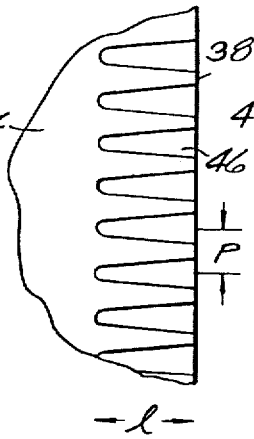
Figure 7A:
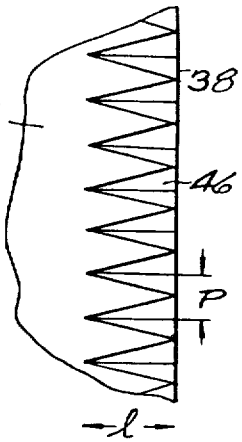

Experiments were conducted using a rotary atomizing bell 39 as shown in FIG. 4 having a diameter of about 7.3 cm ($2\frac{7}{8}$ in.), having a discharge end 38 and end surface 45 of a width b of 1.0 mm. The grooves 46 were shaped in plane and cross section as shown in FIGS. 7a and 8a with a depth d of 0.1 to 0.4 mm, a pitch P of 1.0 mm and a length l of 5 mm. A DC voltage of 90 KV was applied between discharge end 38 and the article to be coated and the revolutions of bell 39 were varied from 7000 to 18,000 rpm. The results showed that, when various kinds of paint having viscosities of 20° C. of from 15 to 50 seconds on a Zahn cup No. 2, are subjected to atomization at paint discharge rates of from 50 to 700 cc/minute, fine atomized paint droplets having a maximum diameter of less than 200μ and a narrow distribution of diameters or a substantially uniform diameter are obtained.

Curve I shown in FIG. 9 shows the distribution of atomized paint droplets obtained by using the bell 39 referred to above rotating at 16,000 rpm, and using paint having a viscosity at 20° C. of 25 seconds on a Zahn cup No. 2 at a paint discharge rate of 450 cc/minute. Curve I shows an average droplet diameter of about 100μ and a variation in droplet diameters of about 20μ.

Curve II shows an average droplet diameter of about 150μ and a variation in droplet diameters of about 60μ which represents the distribution of diameters of atomized paint droplets obtained under the same conditions as mentioned above except that a conventional rotary atomizing bell is used of the same diameter as mentioned above, but which has an annular knife edge-like discharge end and no grooves in the inner peripheral surface of the bell. By comparing Curve I with Curve II, it is readily seen that the present invention produces an excellent improvement compared with a conventional rotary atomizing device.

The above are the explanations about a specific embodiment of the present invention but the present invention is not limied to the above embodiment. The present invention includes, of course, various kinds of changes and modifications which are within the spirit thereof.

We claim:

1. A method of atomizing a liquid paint using a rotating atomizing device and electrostatically coating an article with a smooth homogeneous film of liquid paint, wherein an electrostatic field is established between the peripheral edge of the rotating atomizing device and the article to be coated and the liquid paint flows toward the edge of the atomizing device as a continuous thin film, characterized in substantially reducing the thickness of the paint film as it reaches the peripheral edge by flowing the film over a series of circumferentially spaced recessed grooves which run substantially in the direction of paint flow and terminate at the discharge edge, where said grooves extend into the peripheral edge of the device, and atomizing the liquid paint film as it is projected beyond the peripheral edge.

2. A method of atomizing liquid paint according to claim 1 wherein the thickness of the paint film reaching the peripheral edge does not exceed 100 microns.

3. A method of atomizing a liquid paint using a rotating atomizing device and electrostatically coating an article with a smooth homogeneous film of liquid paint, wherein an electrostatic field is established between the peripheral edge of the rotating atomizing device and the article to be coated and the liquid paint flows toward the edge of the atomizing device as a continuous thin film, characterized by providing adjacent the peripheral edge circumferentially spaced, recessed grooves which extend into the peripheral edge of the device to form the thin flowing film of liquid paint into a series of branch flows of narrow width flowing in the peripheral direction of the edge of the atomizing device, and atomizing the liquid paint from the series of branch flows as the paint is projected beyond the edge of the atomizing device.

4. A method of atomizing liquid paint according to claim 3 wherein the thickness of the branch flows reaching the peripheral edge does not exceed 100 microns.

*5. A method of atomizing a liquid and electrostatically spray coating the surface of an article with the atomized liquid comprising:*

*feeding liquid at a controlled rate from a source to an atomizing means having a surface effective during rotation of said atomizing means for supporting a film of liquid to be atomized, and a circular discharge edge adjacent the liquid film support surface;*

*rotating said atomizing means such that the liquid fed to said atomizing means is formed into a substantially uniform film of liquid on the liquid film support surface;*

*flowing the film of liquid through a plurality of grooves in the liquid film support surface aligned generally in the direction of liquid flow and extending into the discharge edge such that a series of independent streams of the liquid are formed by said grooves, said streams being uniformly spaced circumferentially adjacent the discharge edge, and terminating in strands of liquid that extend beyond the discharge edge and produce a spray of finely divided discrete particles; and*

*establishing between said discharge edge and the article an electric field of sufficient strength to draw the particles away from the atomizing means toward the article.*

*6. A method of atomizing a liquid and electrostatically spray coating the surface of an article with the atomized liquid comprising:*

*feeding liquid at a controlled rate from a source to an atomizing means having a surface effective during rotation of said atomizing means for supporting a film of liquid to be atomized, and a circular discharge edge adjacent the liquid film support-surface having a flat surface generally perpendicular to said liquid film support surface;*

*rotating said atomizing means such that the liquid fed to said atomizing means is formed into a substantially uniform film of liquid on the liquid film support surface;*

*flowing the film of liquid through a series of grooves in the liquid film support surface aligned generally in the direction of liquid flow, terminating at the discharge edge, and opening into the perpendicular surface, such that a series of independent streams of the liquid are formed by said grooves, said streams being uniformly spaced circumferentially adjacent the discharge edge, and producing a spray of finely divided discrete particles; and*

*establishing between said discharge edge and the article an electric field of sufficient strength to draw the particles away from the atomizing means toward the article.*

*7. The method of claims 5 or 6 wherein said atomizing means is a generally bell-shaped atomizing device having a diameter of between about 4 and about 10 centimeters, the discharge edge has a thickness at between about 0.2 and about 1.0 millimeters, each of said grooves has a maximum depth of between about 0.1 and about 0.4 millimeters, each of said grooves has a length of between about 1.0 and about 10 millimeters, and said grooves have a pitch between about 0.2 and about 1.0 millimeters.*

*8. The method of claims 5 or 6 wherein said atomizing means is a generally disk-shaped atomizing device having a diameter of between about 10 and about 64 centimeters, the discharge edge has a thickness of between about 0.2 and about 4 millimeters, each of said grooves has a maximum depth of between about 0.1 and about 3 millimeters, each of said grooves has a length of between about 1.0 and about 15 millimeters, and said grooves have a pitch of between about 0.2 and about 3 millimeters.*

*9. The method of claim 6, wherein said atomizing means has a diameter of between about 4 and about 64 centimeters, the discharge edge has a thickness of between about 0.2 and about 4 millimeters, said grooves have a pitch of between about 0.2 and about 3 millimeters, and each of*

*said grooves has a maximum depth of between about 0.1 and about 3 millimeters and a length of between about 1.0 and about 15 millimeters.*

*10. A method of atomizing a liquid and electrostatically spray coating the surface of an article with the atomized liquid comprising:*

*feeding liquid at a controlled rate from a source to an atomizing means havng a surface effective during rotation of said atomizing means for supporting a film of liquid to be atomized, and a circular discharge edge adjacent the liquid film support surface;*

*rotating said atomizing means such that the liquid fed to said atomizing means is formed into a substantially uniform film of liquid on the liquid film support surface;*

*flowing the film of liquid through a plurality of grooves in the liquid film support surface aligned generally in the direction of liquid flow and having increasing depth in the direction of liquid flow towards the discharge edge such that a series of independent streams of the liquid are formed by said grooves, said streams being uniformly spaced circumferentially adjacent the discharge edge, and terminating in strands of liquid that extend beyond the discharge edge and produce a spray of finely divided discrete particles; and*

*establishing between said discharge edge and the article an electric field of sufficient strength to draw the particles away from the atomizing means toward the article.*

*11. A method of atomizing a liquid and electrostatically spray coating the surface of an article with the atomized liquid comprising:*

*feeding liquid at a controlled rate from a source to an atomizing means having a surface effective during rotation of said atomizing means for supporting a film of liquid to be atomized, and a circular discharge end adjacent the liquid film support surface having a surface inclined with respect to said liquid film support surface;*

*rotating said atomizing means such that the liquid fed to said atomizing means is formed into a film of liquid on the liquid film support surface;*

*flowing the film of liquid through a series of grooves in the liquid film support surface extending into the discharge end surface, such that a series of independent streams of the liquid are formed by said grooves, said streams being spaced along the discharge end surface at positions corresponding to the positions of said grooves and producing a spray of finely divided discrete particles; and*

*establishing between said discharge end and the article an electric field of sufficient strength to draw the particles away from the atomizing means toward the article.*

*12. A method of atomizing a liquid and electrostatically spray coating the surface of an article with the atomized liquid comprising:*

*feeding liquid at a controlled rate from a source to an atomizing means having a surface effective during rotation of said atomizing means for supporting a film of liquid to be atomized, and a circular discharge end adjacent the liquid film support surface;*

*rotating said atomizing means such that the liquid fed to said atomizing means is formed into a film of liquid on the liquid film support surface;*

*flowing the film of liquid through a plurality of grooves in the liquid film support surface extending into the discharge end such that a series of independent streams of the liquid are formed by said grooves, said streams being spaced along the discharge end at positions corresponding to the positions of said grooves, and terminating in strands of liquid that extend beyond the discharge end and produce a spray of finely divided discrete particles; and*

*establishing between said discharge end and the article an electric field of sufficient strength to draw the particles away from the atomizing means toward the article.*

*13. A method of atomizing a liquid and electrostatically spray coating the surface of an article with the atomized liquid comprising:*

*feeding liquid at a controlled rate from a source to an atomizing means having a surface effective during rotation of said atomizing means for supporting a film of liquid to be atomized, and a circular discharge end adjacent the liquid film support surface having a surface inclined with respect to said liquid film support surface;*

*rotating said atomizing means such that the liquid fed to said atomizing means is formed into a film of liquid on the liquid film support surface;*

*flowing the film of liquid through a series of grooves in the liquid film support surface extending into the discharge end surface, such that a series of independent streams of the liquid are formed by said grooves, said streams being spaced along the discharge end surface at positions corresponding to the positions of said grooves, and producing a spray of finely divided discrete particles, each of said grooves producing one of said liquid streams; and*

*establishing between said discharge end and the article an electric field of sufficient strength to draw the particles away from the atomizing means toward the article.*

* * * * *

UNITED STATES PATENT AND TRADEMARK OFFICE

CERTIFICATE OF CORRECTION

PATENT NO. : Re. 31,590

DATED : May 29, 1984

INVENTOR(S) : Michio Mitsui

It is certified that error appears in the above-identified patent and that said Letters Patent is hereby corrected as shown below:

Title page:

IN THE FOREIGN PATENT DOCUMENTS CITED

Page 1, line 3, please delete "32362" and substitute therefor --S-32362--;

Column 4, line 8, please delete "end" and substitute therefor --edge--;

Column 4, line 60, please delete "dve" and substitute therefor --due--;

Column 4, line 60, please delete ";" and substitute therefor --,--;

Column 4, line 64, please delete "cicumferential" and substitute therefor --circumferential--;

Column 7, line 61 please delete "discharged" and substitute therefor --discharge--;

UNITED STATES PATENT AND TRADEMARK OFFICE

CERTIFICATE OF CORRECTION

PATENT NO. : Re. 31,590

DATED : May 29, 1984

INVENTOR(S) : Michio Mitsui

It is certified that error appears in the above-identified patent and that said Letters Patent is hereby corrected as shown below:

Column 9, line 17, please delete "limied" and substitute therefor --limited--;

Column 10, line 26, please delete "support-surface" and substitute therefor --support surface--;

Column 11, line 8, please delete "havng" and substitute therefor --having--.

Signed and Sealed this

*Twenty-eighth* Day of *May 1985*

[SEAL]

*Attest:*

DONALD J. QUIGG

*Attesting Officer* *Acting Commissioner of Patents and Trademarks*